(12) United States Patent
Kothamasu et al.

(10) Patent No.: US 9,100,345 B2
(45) Date of Patent: Aug. 4, 2015

(54) SYSTEMS AND/OR METHODS FOR SUPPORTING A GENERIC FRAMEWORK FOR INTEGRATION OF ON-PREMISES AND SAAS APPLICATIONS WITH SECURITY, SERVICE MEDIATION, ADMINISTRATIVE, AND/OR MONITORING CAPABILITIES

(71) Applicant: Software AG USA, Inc., Reston, VA (US)

(72) Inventors: Vasudeva Kothamasu, Chennai (IN); Devashish Karecha, Bangalore (IN); Warren H. Cooper, Jr., Ashburn, VA (US); Sachin Gadre, McLean, VA (US); Shih-Min Sidney Pao, Vienna, VA (US)

(73) Assignee: Software AG USA, Inc., Reston, VA (US)

( * ) Notice: Subject to any disclaimer, the term of this patent is extended or adjusted under 35 U.S.C. 154(b) by 321 days.

(21) Appl. No.: 13/799,562

(22) Filed: Mar. 13, 2013

(65) Prior Publication Data
US 2014/0181306 A1    Jun. 26, 2014

Related U.S. Application Data

(60) Provisional application No. 61/745,325, filed on Dec. 21, 2012.

(51) Int. Cl.
*G06F 15/16* (2006.01)
*H04L 12/24* (2006.01)
*G06F 9/50* (2006.01)

(52) U.S. Cl.
CPC .......... *H04L 41/5077* (2013.01); *G06F 9/5072* (2013.01)

(58) Field of Classification Search
USPC ......................................................... 709/226
See application file for complete search history.

(56) References Cited

U.S. PATENT DOCUMENTS 8,880,678 B1 * 11/2014 Colton et al. ................. 709/224
2006/0190570 A1 * 8/2006 Booth et al. .................. 709/220

(Continued)

OTHER PUBLICATIONS

Petcu, D., et al., "Towards a Cross Platform Cloud API: Components for Cloud Federation," Proceedings of the 1st International Conference on Cloud Computing and Services Science, 2011, pp. 166-169, XP002723570 (4 pages).

(Continued)

*Primary Examiner* — Jimmy H Tran
*Assistant Examiner* — Wuji Chen
(74) *Attorney, Agent, or Firm* — Nixon & Vanderhye PC

(57) ABSTRACT

Certain example embodiments provide a generic integration framework for connecting on-premises applications with software as a service (SaaS) applications, and/or for integrating the same. The framework of certain example embodiments involves a layered approach (including a Connector Development Kit, connection factory, metadata handlers, and connector services) that helps to, among other things, allow customization of applications in multi-tenant architectures. Design-time wizards help create runtime artifacts and, during runtime, the connector service helps serve as an intermediary between the on-premises application and the cloud service, thereby hiding the complexity of the specific cloud providers. Certain example embodiments advantageously provide a generic and well-integrated solution for connecting an on-premises application to a cloud service in connection with existing containers.

30 Claims, 19 Drawing Sheets

(56) References Cited

U.S. PATENT DOCUMENTS

| | | | |
|---|---|---|---|
| 2010/0185968 A1* | 7/2010 | Hsu et al. ................... | 715/771 |
| 2011/0126168 A1* | 5/2011 | Ilyayev ..................... | 717/103 |
| 2011/0131545 A1 | 6/2011 | Patrascu et al. | |
| 2011/0138049 A1* | 6/2011 | Dawson et al. .............. | 709/226 |
| 2011/0145439 A1 | 6/2011 | Chaturvedi et al. | |
| 2011/0252238 A1* | 10/2011 | Abuan et al. ................ | 713/168 |
| 2011/0277027 A1* | 11/2011 | Hayton et al. ................ | 726/8 |
| 2012/0158821 A1* | 6/2012 | Barros ....................... | 709/203 |
| 2012/0185913 A1 | 7/2012 | Martinez et al. | |
| 2012/0203908 A1* | 8/2012 | Beaty et al. ................. | 709/226 |
| 2012/0233668 A1 | 9/2012 | Leafe et al. | |
| 2013/0006887 A1* | 1/2013 | Balko ........................ | 705/348 |
| 2013/0138810 A1* | 5/2013 | Binyamin et al. ............ | 709/225 |
| 2013/0166709 A1* | 6/2013 | Doane et al. ................. | 709/223 |
| 2014/0108665 A1* | 4/2014 | Arora et al. ................. | 709/227 |

OTHER PUBLICATIONS

Massimiliano, R., et al., "Cloud Application Monitoring: The Mosaic Approach," Cloud Computing Technology and Science (CLOUDCOM), IEEE Third International Conference, Nov. 29, 2011, pp. 758-763 (6 pages).

Zhenyu, W., et al., "Gateway as a Service: A 1-15 Cloud Computing Framework for Web of Things," Telecommunications (ICT), IEEE, Apr. 23, 2012, pp. 1-6, XP032188308 (6 pages).

Petcu, D., et al., "Towards Component-Based Software Engineering of Cloud Applications," Proceedings of the WICSA/ECSA, Aug. 20, 2012, pp. 80-81 (2 pages).

European Search Report issued in European Application No. 13165354, dated Apr. 24, 2014.

Wikipedia—Software as a Service. Adoption Challenges. [retrieved Mar. 13, 2013]. http://en.wikipedia.org/wiki/Software_as_a_service#Adoption_challenges.

U.S. Appl. No. 61/745,325, filed Dec. 21, 2013, Kothamasu et al.

* cited by examiner

```
<documentModel packageName="WmSalesforceConnector_v25" nsName="wmSalesforceConnector_v25.doctypes">

<abstractObject name="docTypeRef_ens_sObject" type="businessObject">
    <lookup ref="wmSalesforceConnector_v25.lookup:businessObjectList" type="boList"/>
    <lookup ref="wmSalesforceConnector_v25.lookup:businessObjectDescribe" type="boDescribe"/>
</abstractObject>

<abstractObject type="schemaObject" name="docTypeRef_tns_Email">
    <lookup ref="wmSalesforceConnector_v24.lookup:schemaObjectList" type="doctypeList"/>
</abstractObject>

</documentModel>
```

Figure 13

SYSTEMS AND/OR METHODS FOR SUPPORTING A GENERIC FRAMEWORK FOR INTEGRATION OF ON-PREMISES AND SAAS APPLICATIONS WITH SECURITY, SERVICE MEDIATION, ADMINISTRATIVE, AND/OR MONITORING CAPABILITIES

CROSS-REFERENCE TO RELATED APPLICATION

This application claims the benefit of U.S. Application Ser. No. 61/745,325, filed on Dec. 21, 2012, the entire contents of which are hereby incorporated herein by reference.

FIELD OF THE INVENTION

Certain example embodiments described herein relate to systems and/or methods for supporting a generic framework for integration of on-premises and software as a service (SaaS) applications. The framework may in certain example embodiments have security, service mediation, administrative, and/or monitoring capabilities.

BACKGROUND AND SUMMARY OF EXAMPLE EMBODIMENTS OF THE INVENTION

Integration of the on-premises applications with cloud applications oftentimes is challenging for customers. With more and more cloud applications being developed, it is becoming increasingly important to be able to integrate and deploy solutions, potentially within weeks or shorter timeframes.

It would be desirable for the integration development framework with software as a service (SaaS) applications to be a generic framework, e.g., with little code and/or few custom adapters. It also would be desirable for the framework to provide, for example, simplified user interfaces (e.g., for design-time development), administrative capabilities to manage the connections and/or applications, security capabilities via WS-Security and/or other approaches, custom and/or standard security policies enforcement and monitoring capabilities for events, metrics at runtime execution, etc.

Certain example embodiments address these and/or other desires. That is, the CloudStreams generic integration framework of certain example embodiments may, for example, use a service bus like Integration Server, provide a CloudStreams engine for Connections, allow native service invocation, enable custom security policy enforcement, etc., potentially in connection with standards-based cloud applications. Design-time development may, for instance, be provided within the Eclipse Plug-ins in certain example implementations. Administration capabilities may be provided using a suitable configured user interface (UI) accessible by any suitably configured device. Monitoring and events capabilities may be made available using the applications, e.g., to render the data.

It will be appreciated, then, that certain example embodiments therefore relate to a generic integration framework that supports integration between on-premises applications and SaaS applications.

One aspect of certain example embodiments relates to using a framework to provide a CloudStreams development kit to develop a Connector Descriptor XML where connections configuration to any service operation (e.g., SOAP or REST Standards based Cloud applications) can be developed; an Eclipse plug-in UI to develop the Cloud Connector Services to interact with Cloud Applications for integration; and/or the like.

Another aspect of certain example embodiments relates to managing connections to the applications through a connection pool manager in connection with the framework.

Another aspect of certain example embodiments relates to developing a Connector Virtual Service and virtual services that enforce the custom and WS-security policies at runtime execution in connection with the framework.

Still another aspect of certain example embodiments relates to providing the capability to monitor cloud applications service level agreements (SLAs) and log events in the context of the framework.

Yet another aspect of certain example embodiments relates to enabling metrics and transactional data to be monitored, potentially at real time, using suitably configured applications (such as, for example, Aris MashZone Mashapps, etc.).

In certain example embodiments, there is provided a computer system configured to enable clients to transparently access one or more cloud-based applications managed by one or more respective cloud providers through connector services administered by the computer system. The computer system comprises processing resources including at least one processor and a memory. The processing resources are configured to coordinate at least: a plurality of metadata handlers, each said metadata handler being an implementation of an interface for accessing at least one of the cloud providers in accordance with a data model with which the associated at least one cloud provider communicates; an exporter module configured to generate, for each said metadata handler implementation, connector descriptors that define services offered by the associated at least one cloud provider; and a plurality of connection factory instances implemented separate from the plurality of metadata handlers, each said connection factory instance specifying client transport layer details for interacting with one or more of the cloud providers and/or cloud applications. The processing resources are further configured to generate the connector services based on input from the connection factory instances and matching connector descriptors.

In certain example embodiments, a client device is configured to transparently access one or more cloud-based applications managed by one or more respective cloud providers. The client device comprises at least one processor, and an interface to connector services administered by a computer system. The computer system is configured to coordinate at least the elements indicated in the preceding paragraph and/or elsewhere herein (e.g., the plurality of metadata handlers, the exporter module, and the plurality of connection factory instances). The connector services may be generated by the computer system based on input from the connection factory instances and matching connector descriptors.

In certain example embodiments, there is provided a first cloud provider in a system including a plurality of cloud providers that manage one or more cloud-based applications. The cloud providers are transparently accessible by one or more client devices through connector services administered by a server, and the first cloud provider comprises processing resources, including at least one processor, a memory, and/or non-transitory storage, that are accessible by the one or more client devices via the server. The server is configured to coordinate at least similar elements to those indicated in the above paragraph (e.g., the plurality of metadata handlers, the exporter module, and the plurality of connection factory instances), and the connector services may be generated based on input from the connection factory instances and matching connector descriptors.

In certain example embodiments, a method of configuring a computer system that enables clients to transparently access one or more cloud-based applications managed by one or more respective cloud providers through connector services administered by the computer system is provided. A plurality of metadata handlers is defined, with each said metadata handler being an implementation of an interface for accessing at least one of the cloud providers in accordance with a data model with which the associated at least one cloud provider communicates. For each said metadata handler implementation, connector descriptors that define services offered by the associated at least one cloud provider are generated in connection with an exporter module. Client transport layer details for interacting with one or more of the cloud providers and/or cloud applications are specified in connection with a plurality of connection factory instances that are implemented separate from the plurality of metadata handlers. The connector services are generated, in connection with at least one processor, based on input from the connection factory instances and matching connector descriptors.

In certain example embodiments, there is provided a method of executing an application in connection with client devices connected to a computer system that enables the client devices to transparently access one or more cloud-based applications managed by one or more respective cloud providers through connector services administered by the computer system. The computer system is configured, e.g., in accordance with the method of the previous paragraph or other techniques set forth herein. The client devices are able to access the one or more cloud-based applications in connection with the connector services administered by the computer system in the execution of the application.

In certain example embodiments, non-transitory computer readable storage mediums may be provided that tangibly store instructions and/or programs that, when executed by a processor of a suitably configured computer system, may perform these and/or other related methods.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which:

FIG. 13 is a "code" snippet, demonstrating how the metadata handler framework of certain example embodiments may provide extensions to perform lookups for abstract and complex operation signatures to be described for the connector service signature;

DETAILED DESCRIPTION OF EXAMPLE EMBODIMENTS OF THE INVENTION

Figure 1:
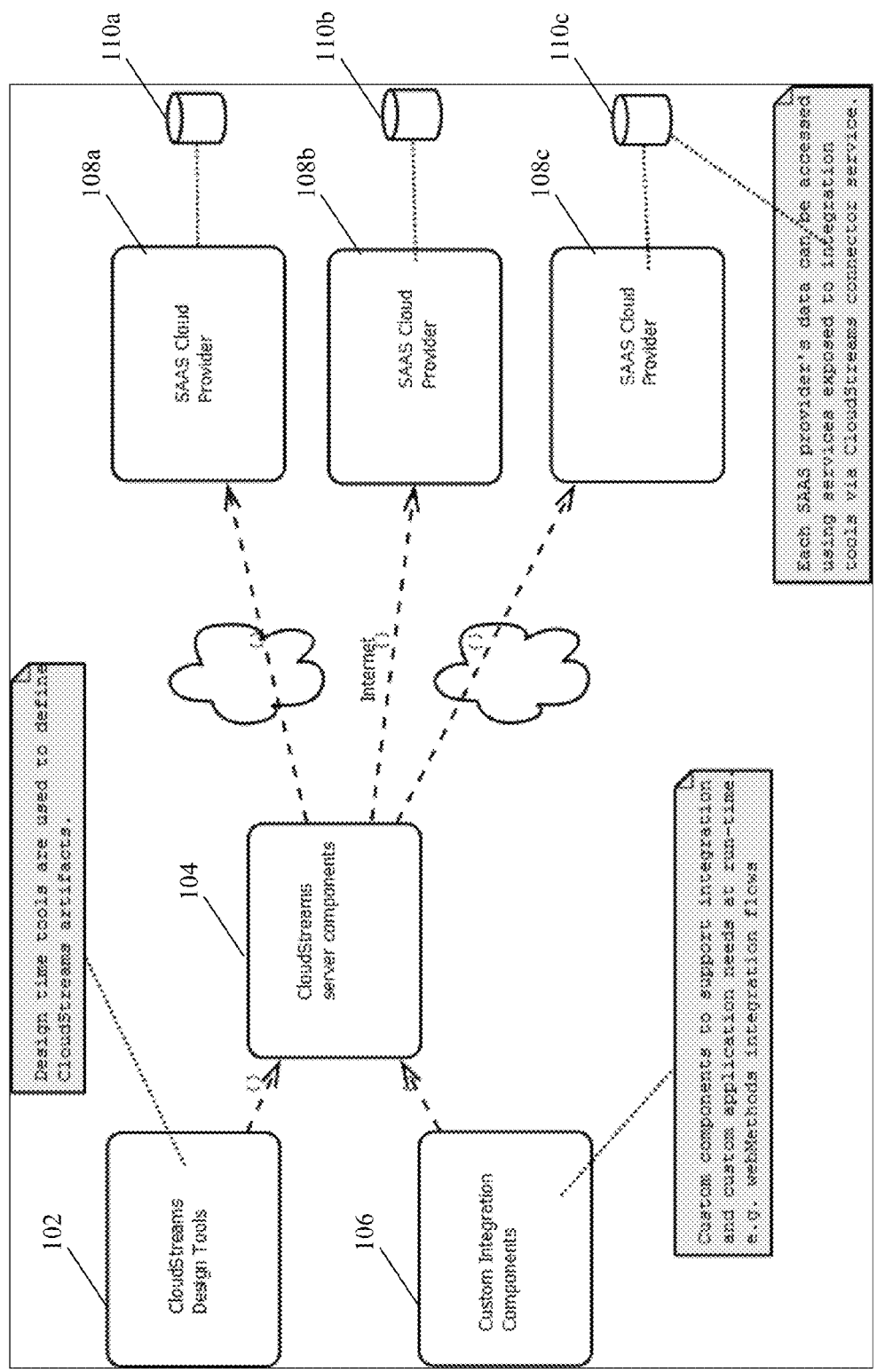
FIG. 1 is a block diagram schematically illustrating the CloudStreams framework of certain example embodiments at a conceptual level in accordance with certain example embodiments.

The CloudStreams Connector framework of certain example embodiments includes design-time features that may be used to quickly build service metadata (e.g. "connectors") to describe services offered by cloud providers, potentially in a format that may be used by the product at design-time and run-time. These connectors provide the means to invoke a provider's services from an integration platform through a canonical interface and message model, regardless of service style (e.g., SOAP or REST) or transport protocol (e.g., HTTP, etc.).

Cloud provider services are commonly referred to as SaaS applications. There are a number of challenges slowing down the acceptance of SaaS and sometimes preventing its acceptance altogether. For example:

Data security may be an issue because data is being stored on the vendor's servers.

SaaS applications are hosted in the cloud, oftentimes far away from the application users, potentially introducing latency into the environment. Some currently believe that the SaaS model is not suitable for applications that demand response times in the milliseconds.

Multi-tenant architectures, which drive cost efficiency for SaaS solution providers, can sometimes limit the customization options of applications, especially for large clients where such customizations are oftentimes necessary.

Some business applications require access to or integration with customer's current data. When such data are large in volume or sensitive (e.g., end users' personal information), integrating them with remotely hosted software can be costly and/or risky, can conflict with data governance regulations, etc.

Constitutional search/seizure warrant laws do not protect all forms of SaaS dynamically stored data. In essence, a "link" is added to the chain of security, and access to the data, and thus extension misuse of that data, are limited by the assumed honesty of third parties or government agencies able to access the data on their own.

Switching SaaS vendors may involve the slow and difficult task of transferring very large data files over the Internet.

Organizations that adopt SaaS may find that they are forced into adopting new versions, which might result in unforeseen training costs, an increase in the likelihood that a user might make an error, etc.

Relying on an Internet connection means that data is transferred to and from a SaaS firm at Internet speeds, rather than the potentially higher speeds of a firm's internal network.

Challenges also may be encountered in terms of compatibility with hardware, other software, and operating systems; licensing and compliance problems (e.g., unauthorized copies with the software program boating the organization); and/or maintenance, support, and/or patch revision processes.

As will be appreciated, many of these challenges may be seen as consequences of accessing software services over the Internet. In that regard, the challenges include the development and the integration of on-premises applications with the SaaS providers. However, the CloudStreams framework of certain example embodiments provides an extendable framework to develop the required integration with SaaS providers. The CloudStreams framework of certain example embodiments also can mitigate the impact of some of these challenges, e.g., by helping to avoid the duplication of data in various systems. For example, rather than copying data and translating it into several application data stores, connector services may be created to reference a SaaS provider's data directly in its native format.

An issue can arise from the Internet deployment model, e.g., where many customers share the same application deployment in a multi-tenant architecture. The conventional approach can limit the scope of customization that is feasible, since each customer may need to access the same shared application. By contrast, in certain example embodiments, the CloudStreams framework can extend the scope of customization possibilities, e.g., when used in concert with the service bus and a suite of products for integration.

FIG. 1 is a block diagram schematically illustrating the CloudStreams framework of certain example embodiments at a conceptual level. As can be seen from FIG. 1, cloud stream design tools 102 enable a user to define CloudStreams artifacts usable by the CloudStreams server components 104. The custom integration components 106, which comprise a set of custom components that may be used to support integration and custom application needs at run-time, also may be sent to the CloudStreams server components 104. An example of a custom integration component is the set of webMethods integration flows. The CloudStreams server components 104 may communicate with various cloud providers 108a-c (e.g., over various networks such as, for example, the Internet, a LAN, a WAN, etc.), who may offer SaaS functionalities. For instance, each cloud provider 108 may provide data from a suitable repository 110 (e.g., repositories 110a-c in FIG. 1) that can be accessed using services exposed via the CloudStreams connector service, which is described in greater detail below.

It will be appreciated that the techniques of certain example embodiments provide dynamic interoperability, e.g., by providing CloudStreams server components that are accessible independent of the cloud provider(s) behind them. In other words, and as will be appreciated from the description below, the techniques of certain example embodiments advantageously isolates the methods of the providers from the users/clients.

Example Implementation

The following sections provide an example implementation that is explained in connection with the architectural layers of the CloudStreams connector framework of certain example embodiments, and then in connection with example design and runtime aspects. Finally, a perhaps more concrete reference implementation is presented, by way of example, using the webMethods suite of products.

Example Architectural Layers

Enterprise products often deliver features that include application programming interfaces (APIs), enabling customization or extension of a feature's attributes. The CloudStreams framework of certain example embodiments may provide an API, but it also may in effect reflect the recognition that the cost of customization may be different depending upon, for example, the tools and skills required to complete tasks. For instance, many products will define a programming language interface and require customers to provide alternate implementations to achieve its customization goals. There are times when this is a perfectly acceptable solution; however, this approach may require access to a software professional with a specialized skill set. It can require additional effort and risk each time a new product release is installed, e.g., while a customer's implementation modules are upgraded.

Figure 2:
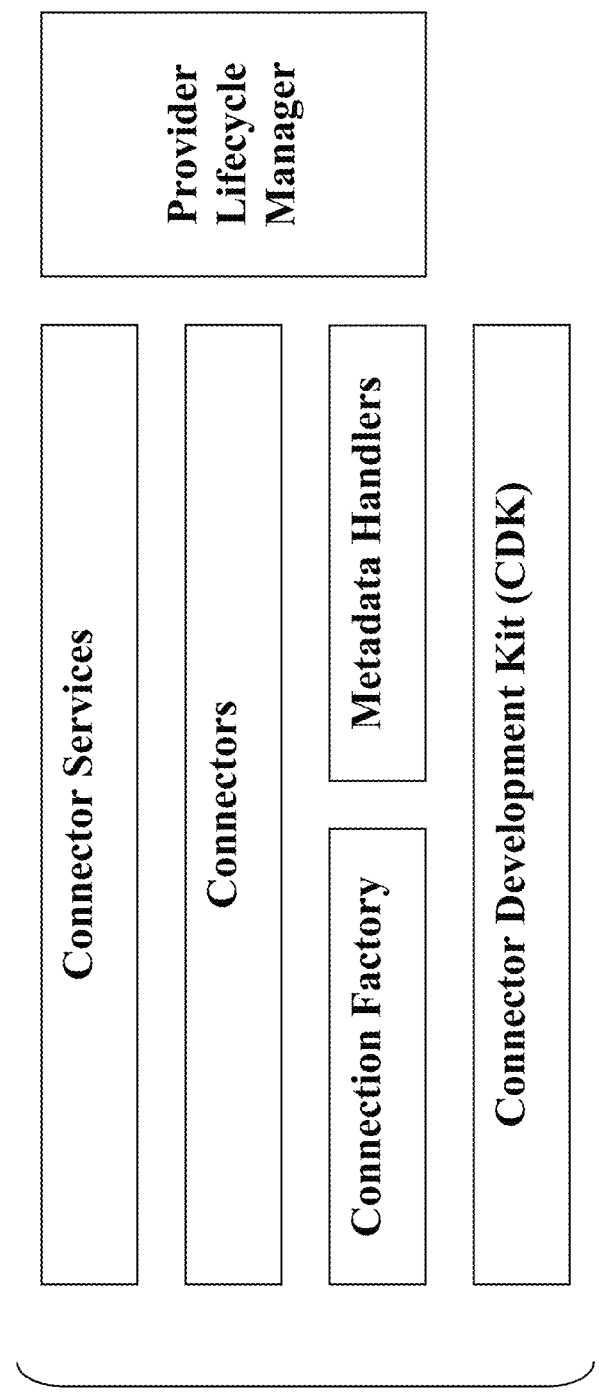
FIG. 2 shows architectural layers that may be used in connection with certain example embodiments.

The CloudStreams framework of certain example embodiments therefore may define different layers in its architecture so that certain customizations tasks may be completed without developing new source program logic, e.g., as shown for example in FIG. 2. The CloudStreams engine of certain example embodiments may comprise multiple components developed using these architectural layers and involve deployment to a service container that serves as a common runtime environment. This service container could be any commonly used enterprise service bus (ESB) such as, for example, webMethods ESB, Oracle ESB, or any other common runtime environment.

FIG. 2 shows architectural layers that may be used in connection with certain example embodiments. The text that follows describes these layers, starting with the lowest level components that support source language custom implementations, and rising through the stack where source programming is not required.

The Connector Development Kit (CDK) shown in FIG. 2 is an abstract layer for interacting with all SaaS applications in a uniform way. The Connector Descriptor Kit may be thought of as being a set of libraries and an API for describing a SaaS provider's services and operations. Key aspects of all supported SaaS providers may be defined in terms of the interfaces found in this kit, e.g., so that the service operations may be accessed in a consistent manner. For example, interfaces may exist to gain access to a provider's service metadata, the registry of a provider's registered services, and various services such as import and export functions. The CDK may include design-time and run-time interfaces that work together to deliver features such as, for example, cloud provider management and access of a provider's "connector" resources.

Metadata handlers and the connection factory may be provided as separate elements, but may reside on the same level, in certain example implementations. The metadata handlers may, for example, specify how providers can be made available. By contrast, the connection factory may specify how to connect to the cloud providers including, for example, physical level details. This approach is advantageous because it is modularized and flexible. For example, if login, security, or other credentials are changed, then it is possible to change only the connection factory, without having to worry about the metadata handlers. Service replacement also becomes more streamlined. It is noted that many implementations will not involve more connection factory instances than metadata handler instances.

Referring more particularly to the metadata handlers, it is noted that cloud providers may be grouped together based upon, for example, attributes that they share with other providers. For instance, many providers may be defined as SOAP services whose operations are defined with a WSDL, whereas another set of providers may utilize REST and contain no additional metadata description. A metadata handler thus may be thought of as an implementation of an interface that describes how this information is acquired from providers that are accessible using the handler's implementation. Each handler implementation may have its own data model. In other words, a schema for a handler's data model may not be explicitly defined in the interface, so each implementation may be free to choose its own data model. For example, a WSDL-based handler implementation may have a data element in its model to describe a WSDL URL; however, a REST handler may have no need for this information.

Certain example embodiments may deliver handler implementations for REST and WSDL 1.1 based SaaS providers. Of course, it will be appreciated that these interfaces may be extendable to other implementations beyond REST and WSDL 1.1 in different embodiments. Source language implementations of core design time metadata interfaces also may be written for extended implementations in some scenarios. This approach may make it easy to develop connectors for other SaaS providers whose services are not exposed as REST or WSDL 1.1.

Figure 3:
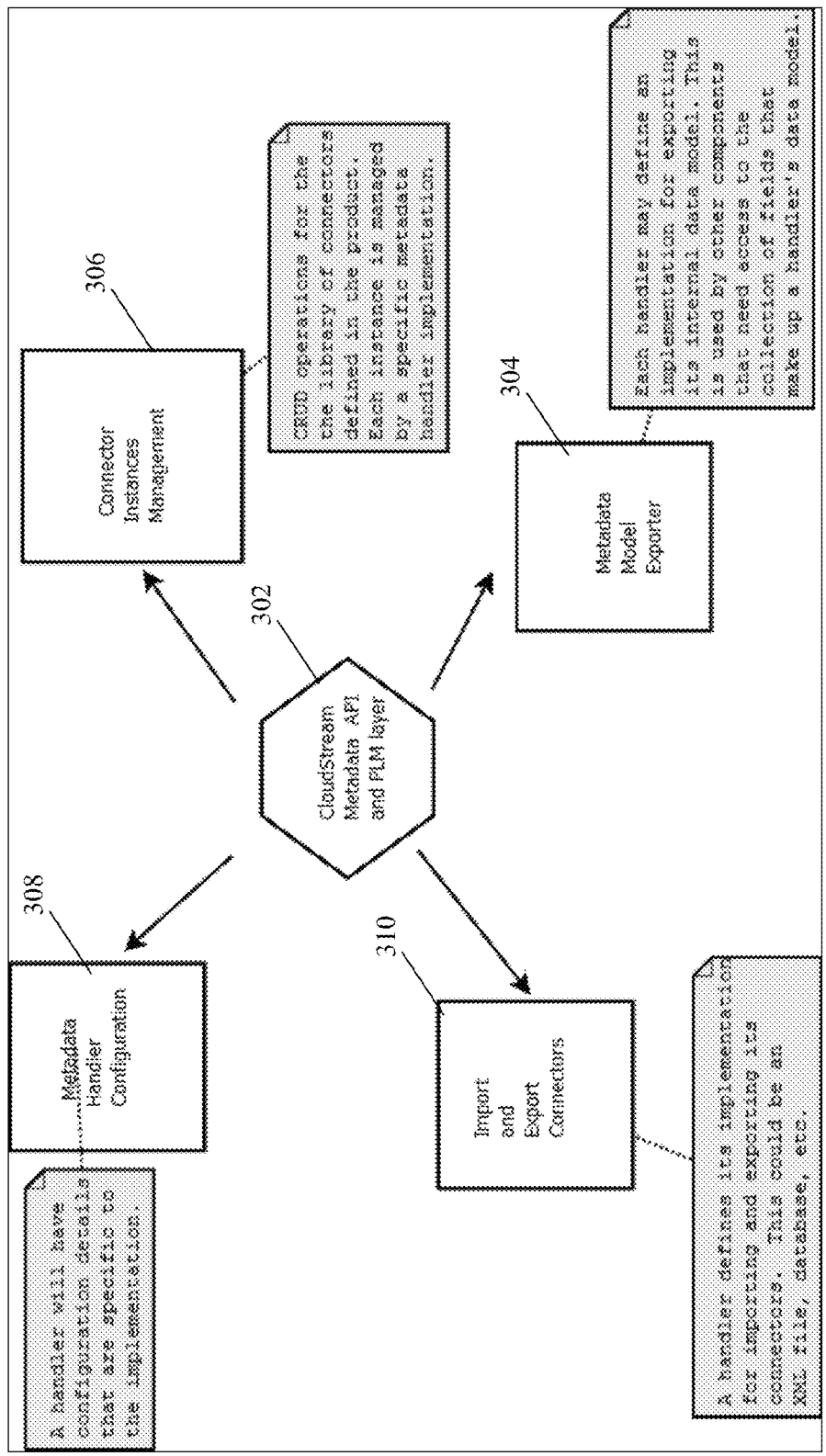
FIG. 3 illustrates the services that a metadata handler implementation may support in connection with certain example embodiments.

FIG. 3 illustrates the services that a metadata handler implementation may support. In other words, FIG. 3 may be thought of as illustrating the metadata handler API 302. The metadata handlers API implementation may involve a metadata model exporter, e.g., for developing the entities called "connector descriptors" that define provider services. One or more handlers may be provided, and each handler may define an implementation for exporting its internal data model. The exporter 304 may be used by other components that need to access the collection of fields that comprise a handler's data model. The CloudStreams framework of certain example embodiments may include services to manage the lifecycle of these connector descriptors produced by its set of metadata handlers and, to this end, a connector instances manager 306 may be provided. The connector instances manager 306 may, for example, support CRUD (Create, Read, Update, Delete) operations for the library of connectors defined in the product, with each instance potentially being managed by a specific metadata handler implementation. The metadata handler 308 may provide configuration details that are specific to the implementation, and another handler 310 may be provided for importing and exporting its connectors. The import and export format may be the same or different in different example implementations, and the formats that are acceptable may include, for example, XML files, commercial or propriety database related files, etc.

Figure 4:
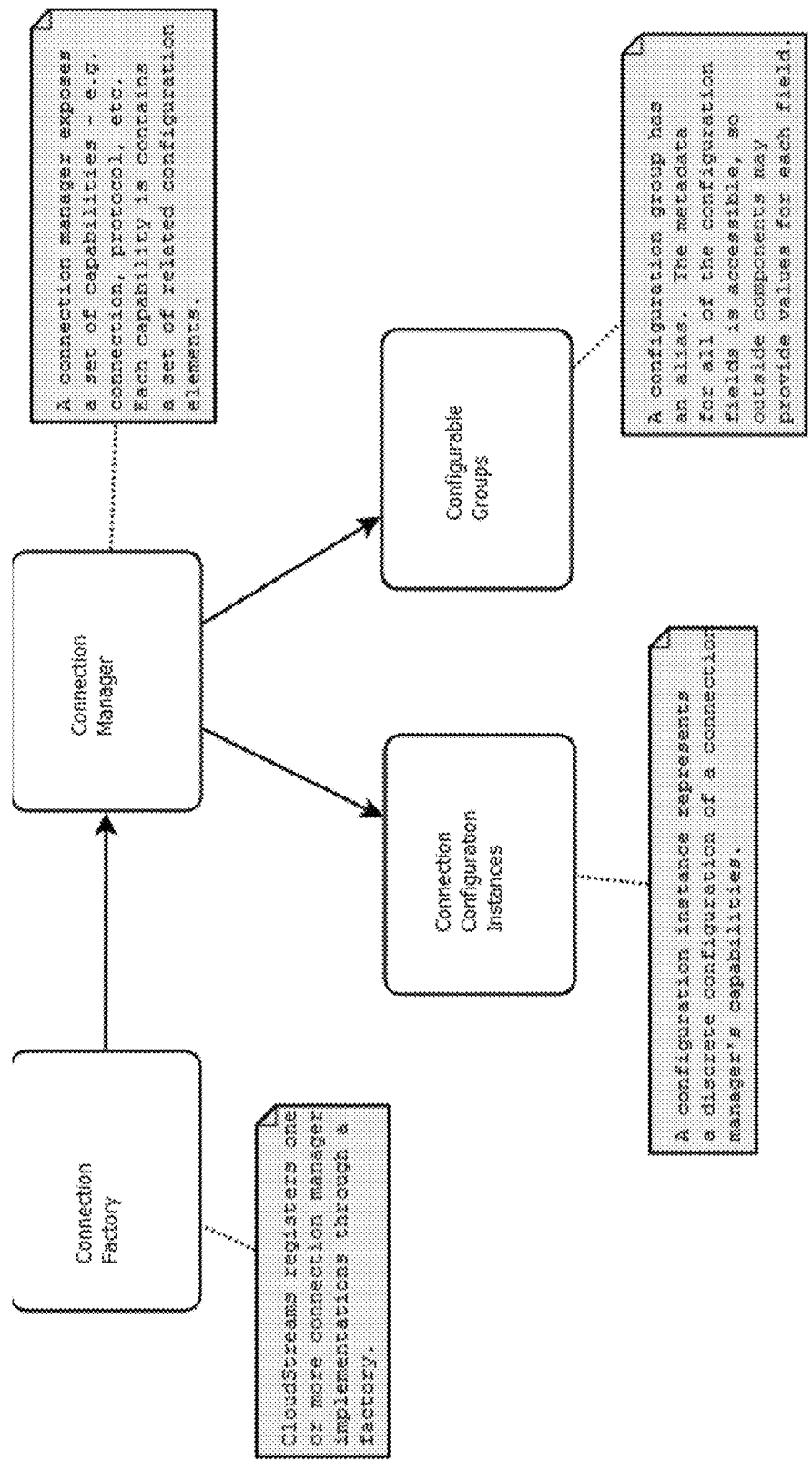
FIG. 4 shows a simplified, schematic configuration of a connection factory using configurable groups in accordance with certain example embodiments.
Figure 5:
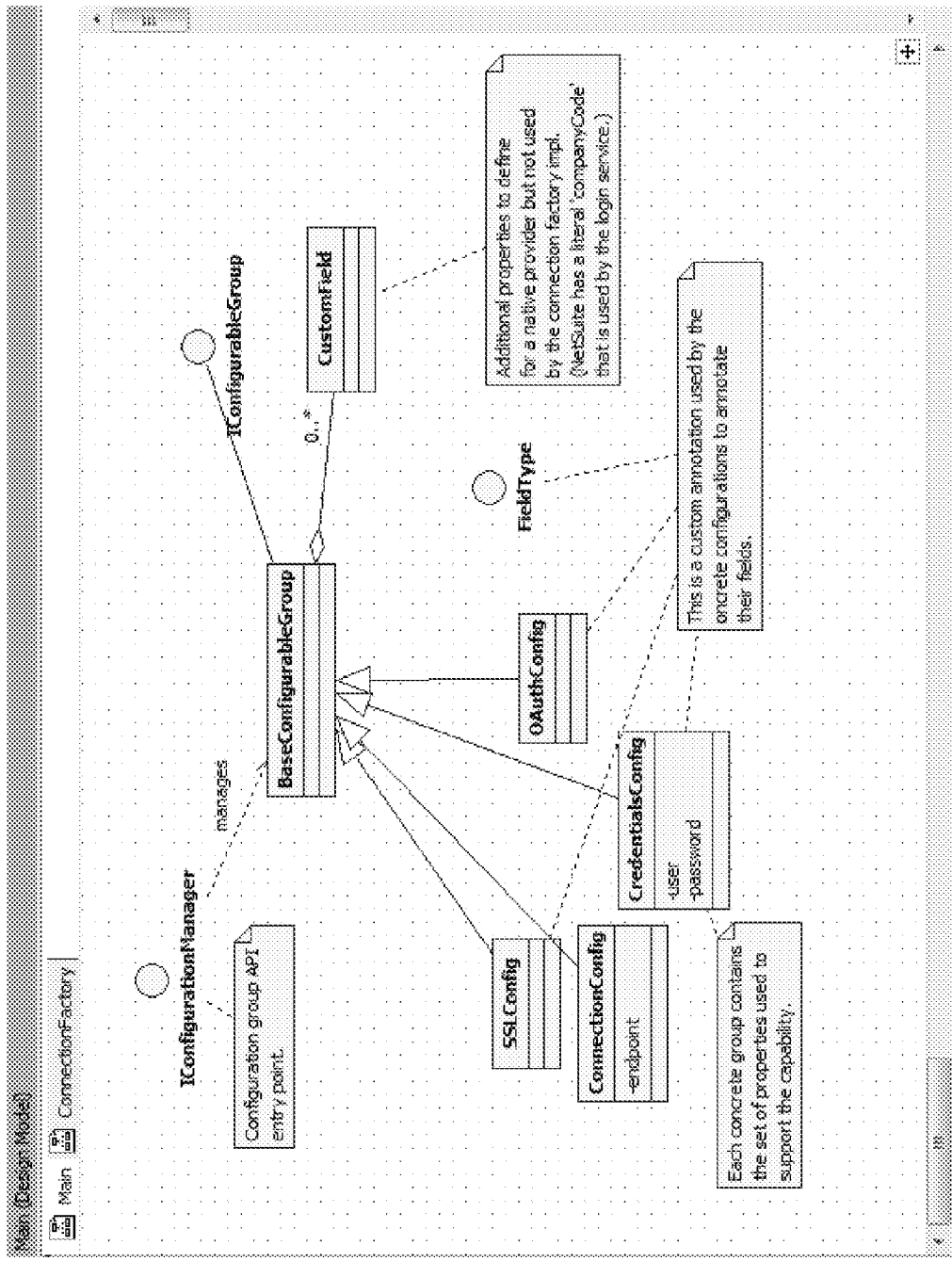
FIG. 5 shows exemplary extensions of configurable groups for a connection factory in accordance with certain example embodiments.

As alluded to above, the connection factory layer may in essence describe the rich metadata for the client transport layer used to interact with the SaaS provider. Certain example embodiments may deliver a connection factory module implementation configured/programmed to invoke providers, e.g., over HTTP/S. FIG. 4 shows a simplified, schematic configuration of a connection factory using configurable groups in accordance with certain example embodiments, and FIG. 5 shows exemplary extensions of configurable groups for a connection factory in accordance with certain example embodiments. These interfaces may, for example, expose a transport layer's configuration features in terms of "configurable groups." For instance, a HTTP client library may have sets of related configurable fields used to managed connections, credentials, HTTP protocol, etc. By defining access to a connection factory in terms of groups of configuration, one may choose a subset of groups via a configuration step to use when invoking a remote service. New implementations could be built when connections to other (non-HTTP) transport protocols are needed in certain example scenarios.

Referring once again to the layers shown in FIG. 2, the Provider Lifecycle Manager (PLM) interface may provide CRUD operations typically involved in maintaining a repository of registered services and operations. The manager may span the entire set of cloud providers that may be supported by several metadata handlers. At design time, certain example embodiments may use this component to create new connector instances. At runtime, the PLM may manage existing cloud provider "connectors."

The connectors and connector services may, in essence, complete the configuration details. For example, the connector layer may define access to a remote service in terms of a specific metadata handler implementation, and instances of these connectors may contain the concrete details associated with invoking operations in a provider's services. Although the metadata handler abstraction layer may involve someone developing new libraries written in Java or other source code languages, the connector layer may provide extensibility without having to write any source code, e.g., by using one of the metadata handler implementations delivered with a CloudStreams-enabled product. If a user wishes to create connectors to access a new remote service provider capable of being serviced by one of these metadata handlers, in certain example embodiments, no source code is necessary to accomplish this task. For example, if the service is a Soap WSDL 1.1 implementation, then a new connector descriptor may be created for this service provider. It will be appreciated that this descriptor may not be a simple captured WSDL; instead, additional information elements that go beyond the scope of a WSDL service description may be necessary to communicate with the provider in the CloudStreams environment of certain example embodiments. For example, a connection configuration that specifies specific groups of configuration fields from a connection factory may be designated for a connector descriptor may be included in the descriptor.

Referring once again to FIG. 5, it will be appreciated that the connection factory may enable the registration of one or more connection manager implementations. The connection manager may, as detailed above, expose a set of capabilities (e.g., connections, protocols, etc.), with each capability potentially including a set of related configuration elements. These elements may be separated into connection configuration instances (representing a discrete configuration of a connection manager's capabilities) and connection groups that are potentially aliased. The metadata for the configuration fields in each group may be made available, e.g., so that outside components may provide values for each such field.

Figure 6:
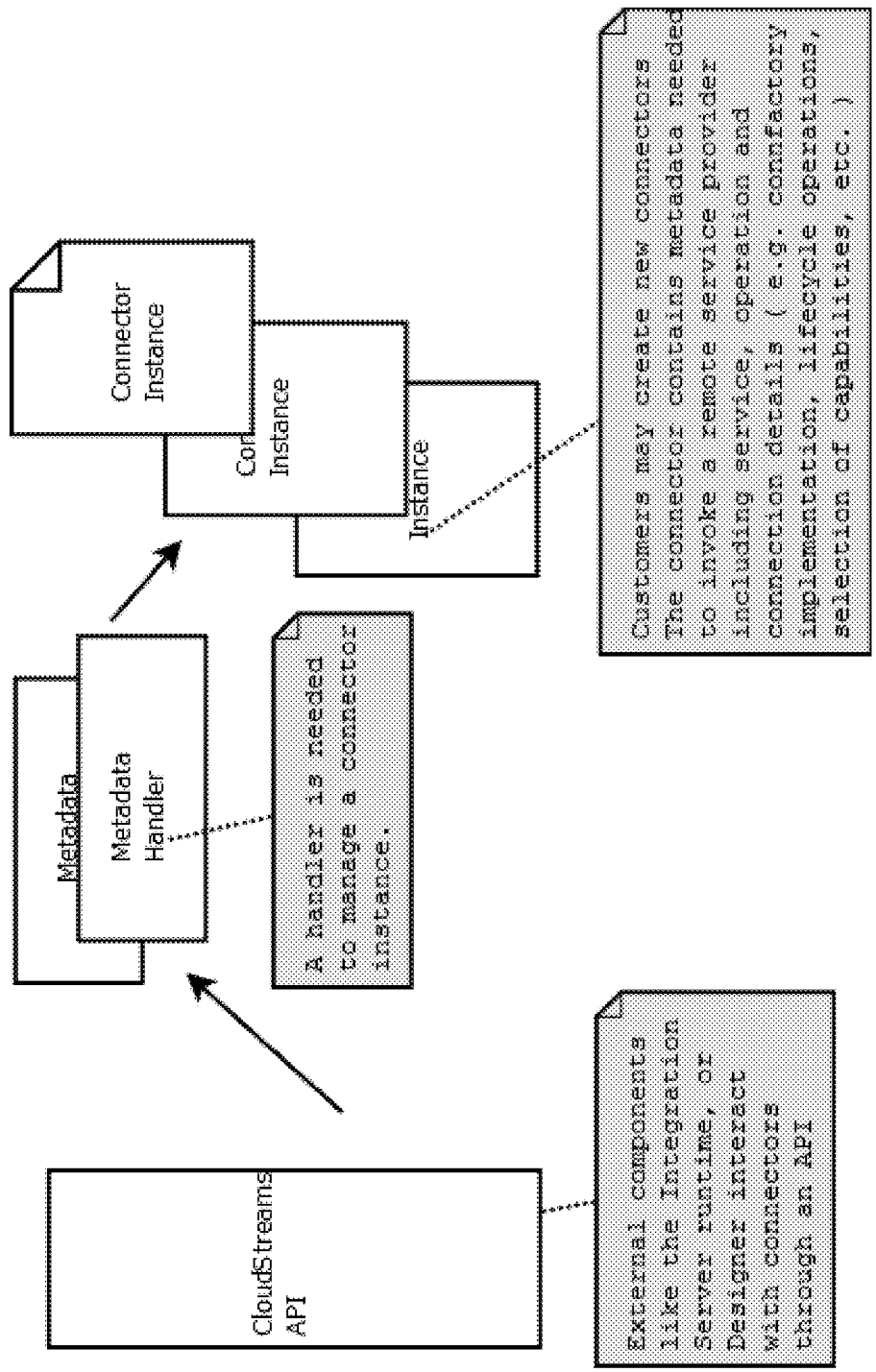
FIG. 6 shows the relationship between a connector instance and a metadata handler in accordance with certain example embodiments.

FIG. 6 shows the relationship between a connector instance and a metadata handler in accordance with certain example embodiments, and an example descriptor (Salesforce_v25.xml) is shown in the appendix attached hereto. The CloudStreams API may enable external components such as, for example, an Integration Server runtime or Designer, to interact with connectors via that API. The metadata handlers may help manage connector instances. Customers may create new connectors, with the connector instances potentially including metadata needed to invoke a remote service provider as noted above. In this regard, the connector may provide service, operation, and connection details such as, for example, details concerning connection factory implementation, lifecycle operations, selectable capabilities, etc.

Using existing integration products in a service bus, connector services may be created and configured from the connectors registered in the product. Once a connector service has been configured, it may be used to interact with the cloud service using available features from the integration product (e.g., an Integration Flow).

The following table summarizes the abstraction layers available to customers in accordance with the exemplary architecture set forth above:

| Abstraction Layer | Add'l. source code or configuration? | Details |
| --- | --- | --- |
| Connector Development Kit | Source Code | Interfaces may be provided by the CloudStreams Engine. |
| Metadata Handler | Source code | Source code may be used to build new library implementations. Certain example embodiments may include WSDL 1.1 and REST resources handlers. |
| Connection Factory | Source code | Source code may be used to build new library implementations. Certain example embodiments may include an HTTP implementation. |
| Connector | Configuration | Descriptors define service, operation, fields, connection aliases, lifecycle operations, and/or other details necessary for certain exemplary embodiments to invoke the provider services. The metadata handlers may use an XML storage implementation to persist these instances in packages. |
| Connector Service | Configuration | Developed using design-time tools using the connector definition and metadata handlers. |

Example Design Time Aspects

To develop the generic framework for integration of on-premises and cloud applications, certain example embodiments may provide a design-time toolkit and user interfaces that can be used to develop artifacts useful in run-time execution. A series of example "wizards" are described below. It will be appreciated, however, that the screenshots and parameters are exemplary in nature.

Figure 7:
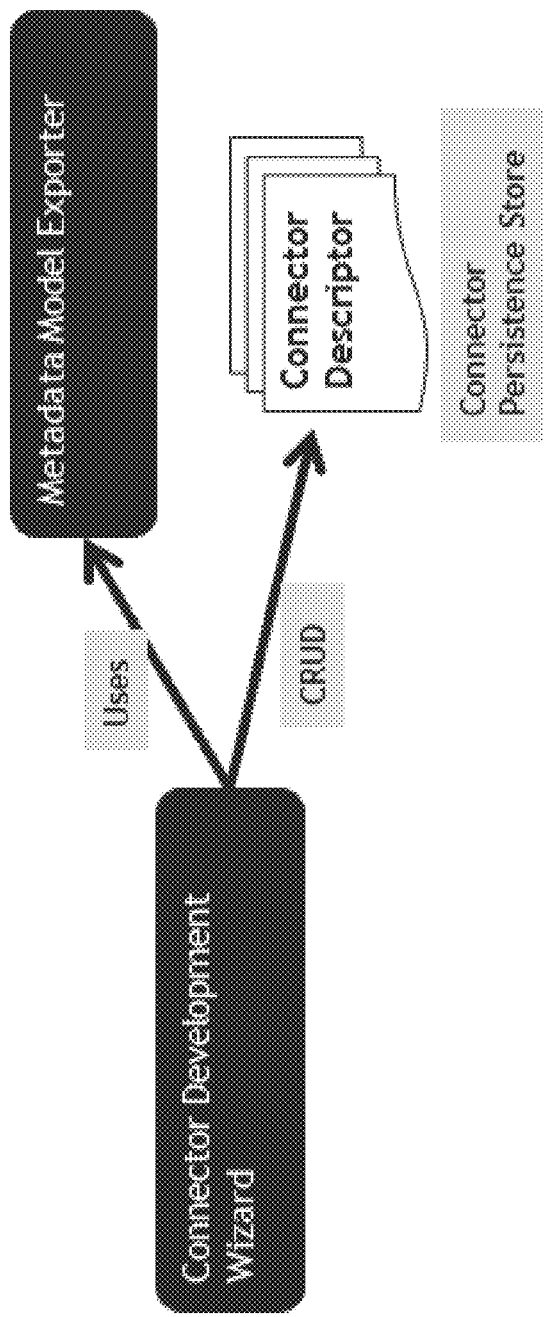
FIG. 7 shows how a connector development wizard, a metadata model exporter, and a connector descriptor may be related to one another in accordance with certain example embodiments.

A connector development wizard of certain example embodiments may help develop the connector descriptors using metadata model exporter interfaces for the registered metadata handlers within the CloudStreams Engine deployed on the service container. The connector descriptors developed using the wizard may be persisted on disk. FIG. 7 shows how these components are related to one another in accordance with certain example embodiments. In brief, a connector development wizard may use the metadata model exporter and provide CRUD support as to connector descriptors that may be stored to a persistent or other data store.

A connector virtual service wizard may in accordance with certain example embodiments provide design time tools used in developing policies to be enforced at runtime such as, for example, Service Level Agreements, performance metrics, and events monitoring, etc. These three and/or other policy types may be defined in accordance with certain example embodiments. The connector virtual service configuration using the required policies may be deployed to the service container using the deployment APIs of the CloudStreams engine of certain example embodiments.

Figure 8:
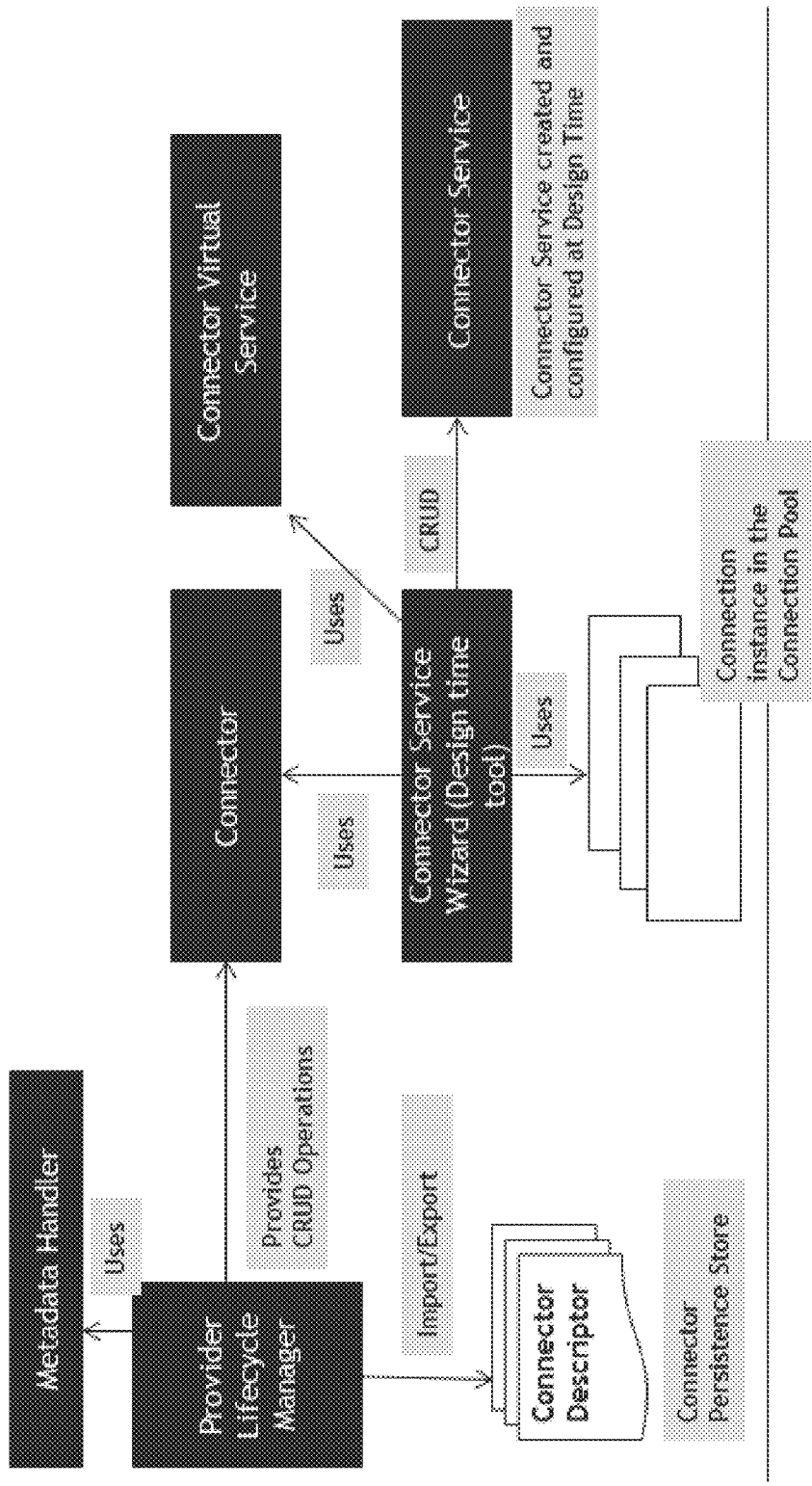
FIG. 8 shows creation of the connector service at design time in accordance with certain example embodiments.

As indicated above, connector services are concrete configured instances of one of the logic operations defined in a connector. The connector services may use the interfaces of the connector to describe and define the service signature. The service signature may govern the interaction, e.g., in terms of message exchange for the integration. The connector service wizard may interact with the connector for metadata introspection and lookup, optionally using a connection from the connection pool, to generate the connector service. The connector service wizard, as part of the design-time tools, may interface or otherwise facilitate the development and configuration of the connector service, and help prepare for execution. FIG. 8 shows creation of the connector service at design time in accordance with certain example embodiments.

Figure 9:
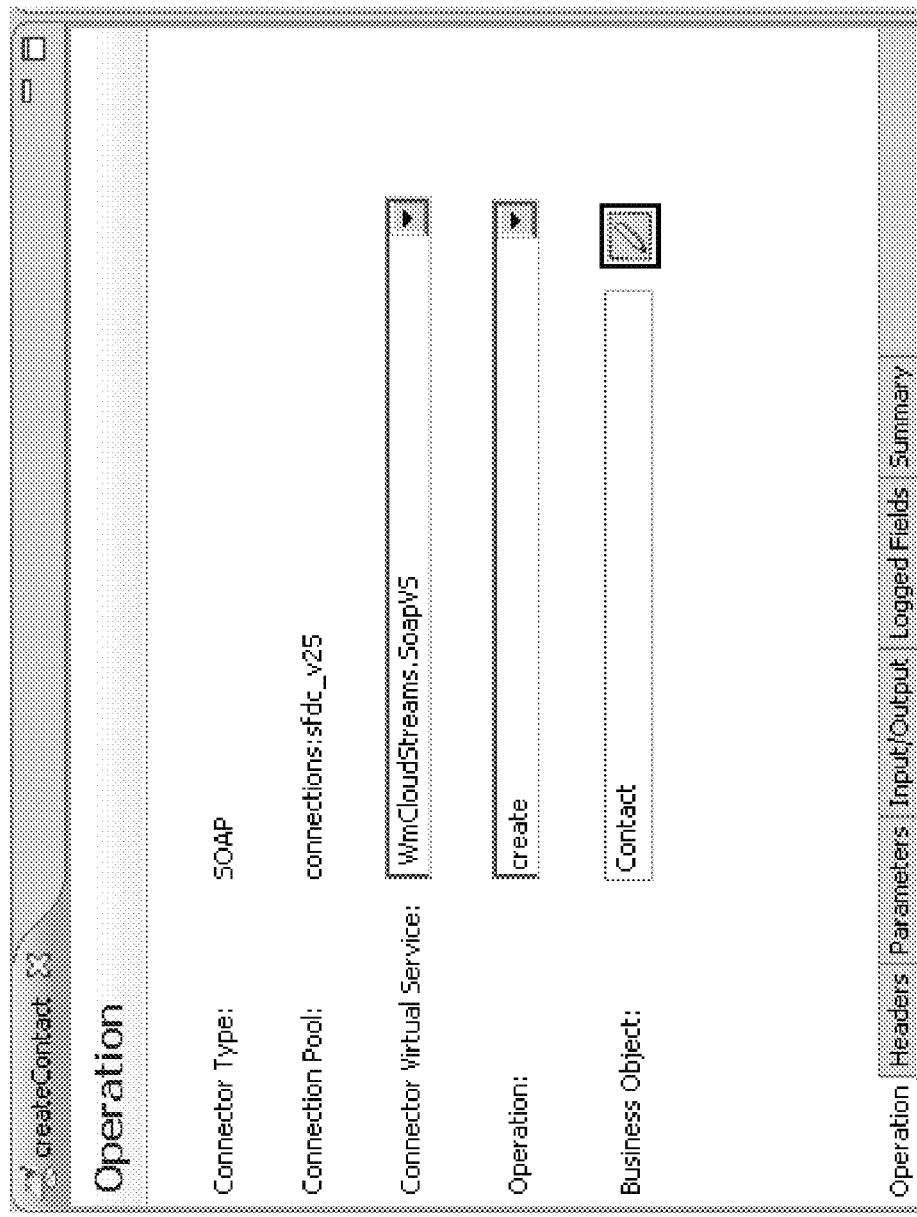
FIGS. 9-12 are example screenshots showing the creation of an illustrative connector service using an illustrative connector service wizard, in accordance with certain example embodiments.
Figure 10:
Figure 11:
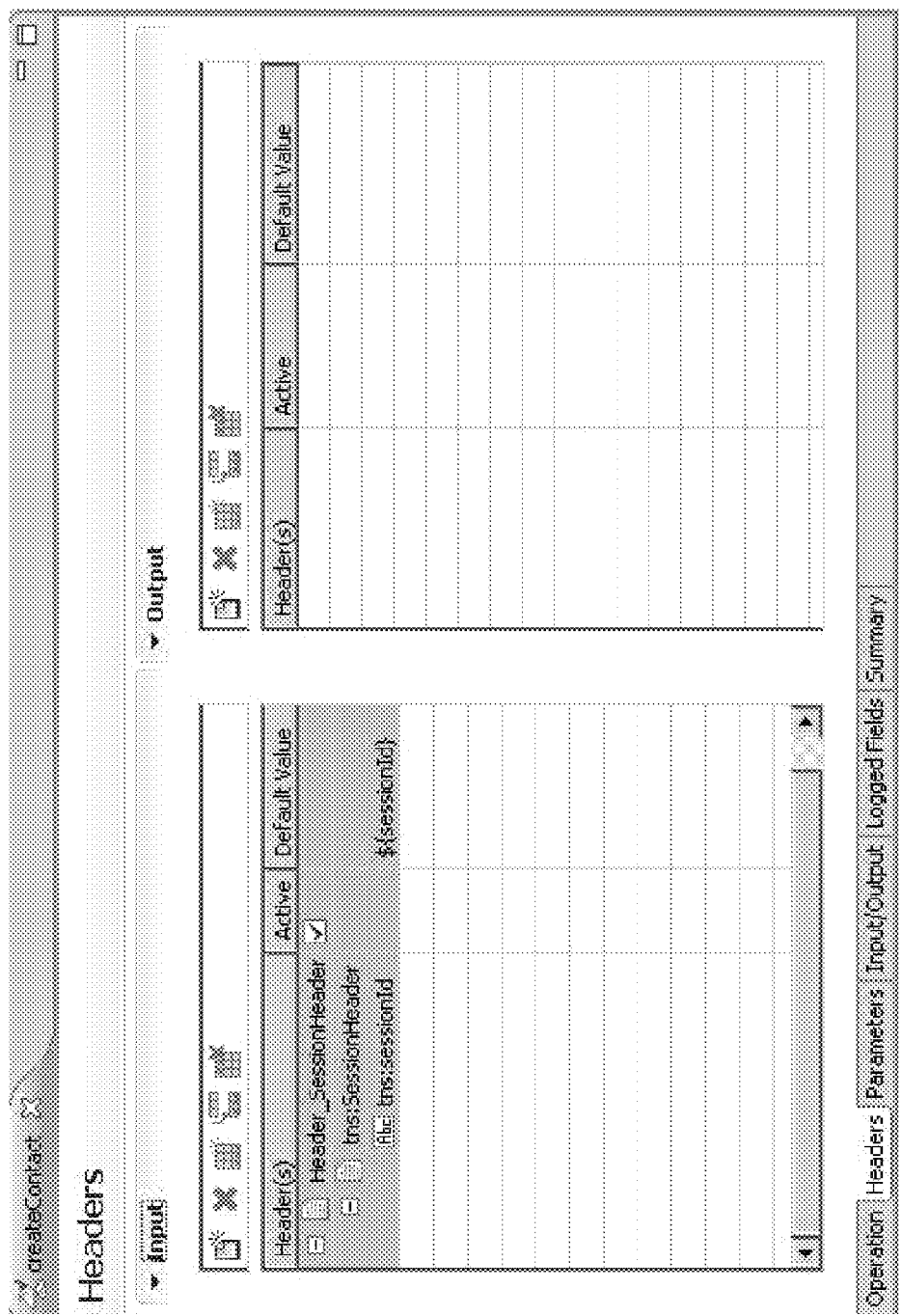
Figure 12:
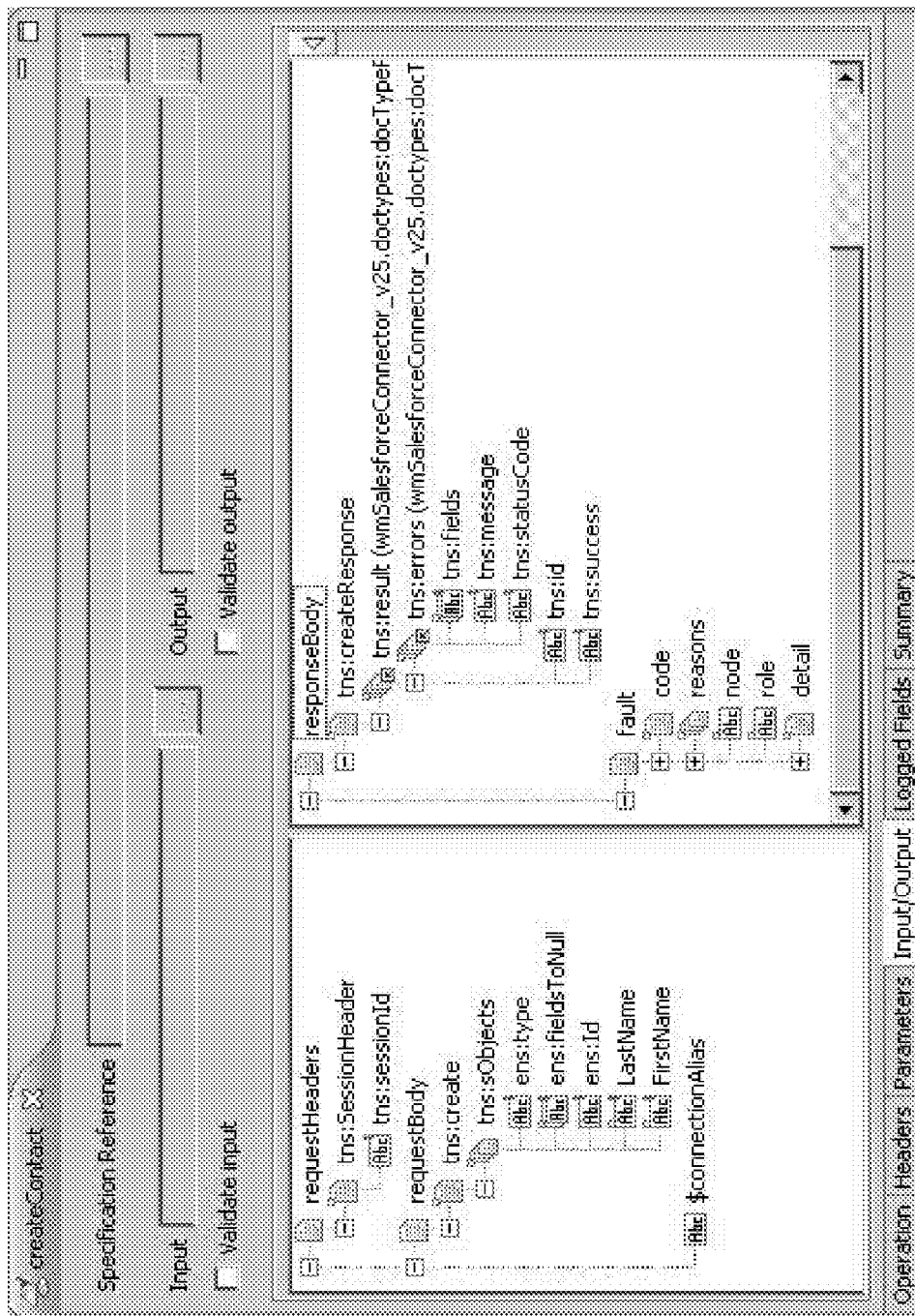

FIGS. 9-12 are example screenshots showing the creation of an illustrative connector service using an illustrative connector service wizard, in accordance with certain example embodiments. More particularly, FIG. 9 shows the configuration of a SOAP connector service for a "create" operation in the foreground and the various business objects that are selectable in the background; FIG. 10 shows the configuration of the connector service with illustrative business object and fields; FIG. 11 shows the configuration of connector service headers, e.g., in terms of input and output and associated indications as to whether they are active and what (if any) default values should be provided; and FIG. 12 shows the configuration of an input/output signature of the connector service. As indicated above, these screenshots are exemplary in nature, as is the data reflected therein. Other arrangements that enable the definition of the same and/or other parameters in these and/or other ways may be used in connection with different example embodiments.

Basic information is provided in FIG. 9 such as, for example, the connector virtual service, the selected operation, and the selected business object. Through the FIG. 10 example interface shown in the foreground, a user can select the parameters for use with the business object selected through the FIG. 9 example interface and/or the FIG. 10 example interface shown in the background. Various information (including field name, field label, native type, SOAP type, etc.) is provided to potentially aid with the parameter selection process.

The connector descriptor may in certain example embodiments include one or more definitions of an abstract object, per service, referred by the service containers document type.

Operations can be described in terms of simple/concrete or complex/abstract operations. Simple operations may be thought of as those that include fixed messages. Some providers use abstraction to define a generic class of operations. For example, an abstract type definition might require a dynamic metadata call against the SaaS provider to get the concrete object definition. The metadata handler framework of certain example embodiments may provide extensions to perform lookups for abstract and complex operation signatures to be described for the connector service signature, e.g., as shown in FIG. 13.

In accordance with certain example embodiments, the connector service may be executable when deployed to a service container.

Figure 14:
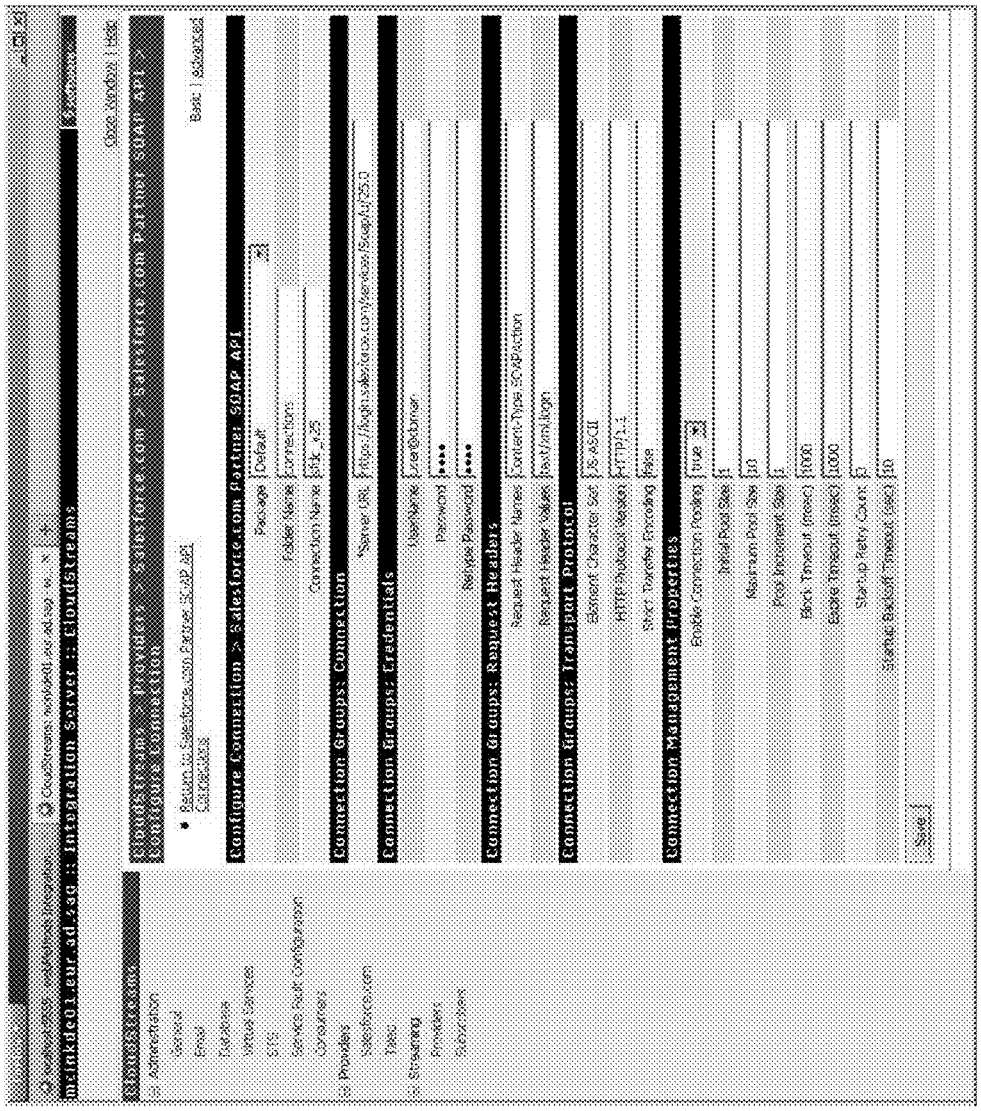
FIG. 14 shows an illustrative connection factory configuration screen in accordance with certain example embodiments.

An administrative UI may be used to configure the connection factory instances. In this regard, FIG. 14 shows an illustrative connection factory configuration screen in accordance with certain example embodiments. The instances of connections created from the connection factory may be managed within a connection pool in certain example embodiments, and the instances of the connection factory may be deployed on the service container. These and other properties may be managed through configurable properties located under the connection management properties header. Similarly, a user may manage the connection configuration, the connection group information (including a server URL and credentials), request header information, transport protocol related items, etc.

Figure 15:
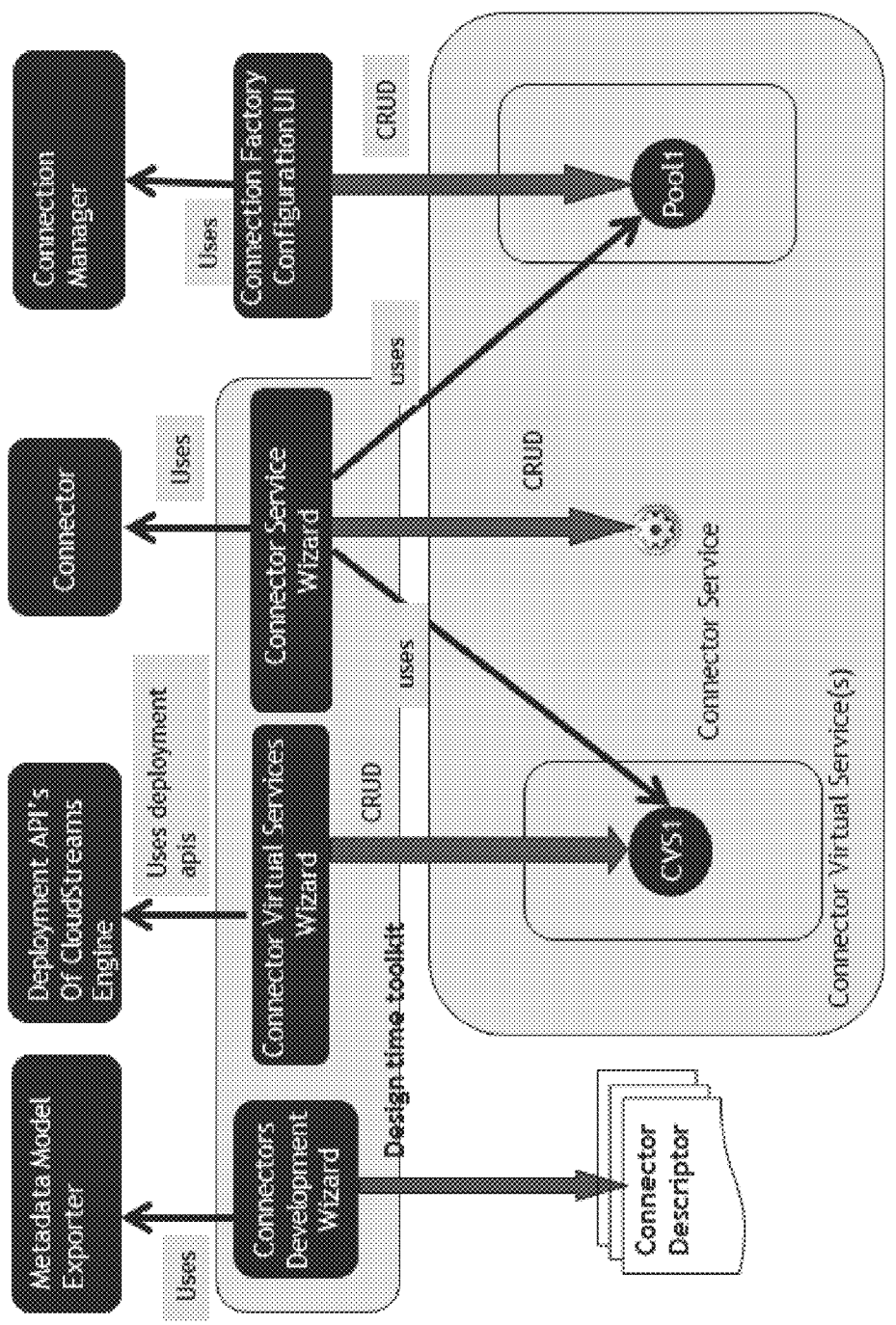
FIG. 15 is a schematic representation of the various example aspects of a design-time tool suitable for use with certain example embodiments.

FIG. 15 is a schematic representation of the various example aspects of a design-time tool suitable for use with certain example embodiments. FIG. 15 also shows how these various aspects may work together in the creation of design-time development of various components that may be usable at run time.

Example Runtime Execution

Figure 16:
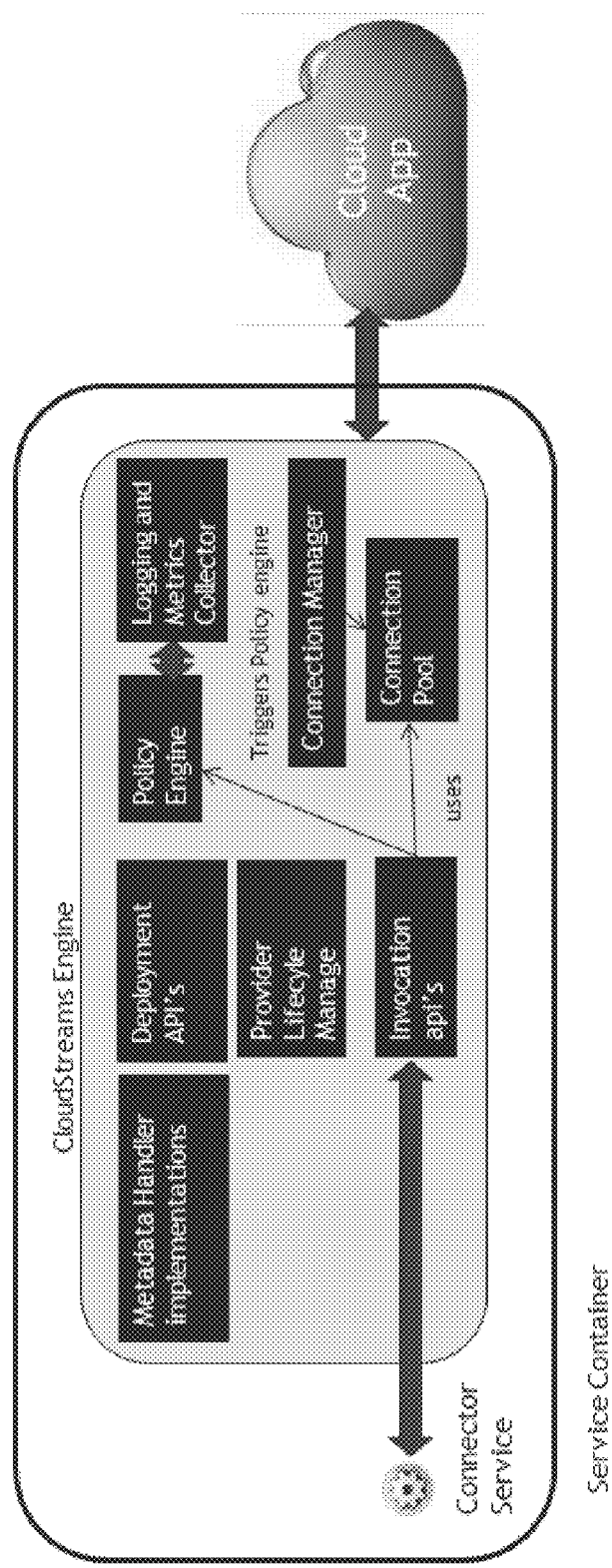
FIG. 16 shows active components of the CloudStreams engine of certain example embodiments.

Different components may work together during the runtime execution of a connector service in different example scenarios and, in this vein, a CloudStreams engine deployed in a service container may include multiple active components at runtime. FIG. 16 shows active components of the CloudStreams engine of certain example embodiments.

The metadata handler implementations as explained herein may be thought of as being the implementations in the CloudStreams engine that are available at runtime. These implementations may be used by the provider lifecycle manager for initializing the Connectors in the service container. It will be appreciated that an existing implementation could be used for multiple connectors and there could be multiple implementations available at any time.

The connection manager initializes the connection objects from the configured connection factory instances. The connection manager manages the connection pools with the minimum and maximum number of connections, idle timeout for session management, etc. The connection objects are managed within a connection pool, and connection objects are served for requests to execute the connector service.

The provider lifecycle manager described above may be used at design time and/or runtime. At runtime, the provider lifecycle manager may manage the connector instances. Using the metadata handler implementations and connector descriptors from the persistence store, the provider lifecycle manager may initialize the connectors.

The deployment APIs may be used by the design-time tools to deploy the connector virtual services to the service container. The deployment APIs in certain example embodiments could use the web services to enable the separation of design time tools and the engine.

Invocation APIs of the CloudStreams engine may provide the APIs to initiate a request from the connector service and return the response from the SaaS application. These may transform the input message format as per the protocol requirement of the SaaS application and response to the connector service required signature format. The invocation APIs may, for example, use the connection object served by the connection manager, and also trigger the policy engine for enforcement of policies.

The CloudStreams framework of certain example embodiments may include a runtime policy engine component that is used to produce events, capture key performance indicator (KPI) data, and process extended runtime policies. The policy engine may serve functions related to, for example, policy management, event collection, and policy evaluation/reporting. The policy management may be responsible for creating the policy instances from connector virtual service, while event collection may happen when a service is executed and policy evaluation is performed, e.g., based on the policy criteria. The runtime policies may include log invocation, monitoring policies for KPIs, and service level agreements (SLAs) for specific consumer applications. Specific events for errors and policy violations may be generated by the policy engine.

When a service request is processed in accordance with CloudStreams framework of certain example embodiments, a policy engine interaction may occur, and policy expressions may be evaluated during a discrete time interval. Runtime events generated by the log invocation or policy violations may be handled by event handlers. The logging and metrics collector collects these events and KPIs and publishes them to a defined destination which may, for example, be a relational database or data store in certain example scenarios.

The connector service of FIG. 16 may be thought of as the runtime component that provides the link between the clients and what the providers will do. In this sense, it is a central point of connectivity, providing a single API (e.g., through an Integration Server) and, in this sense, is not the same as a standard SOAP service. The cloud connector service in certain example embodiments encapsulates the provider's API message input/output signature definition and may provide a connection pool to be used at runtime and policies that will be enforced during execution. At runtime, because of this extraction of details included in the connector service definition, a client application using the connector service may only need to provide the input parameters as defined in the signature. The CloudStreams engine invocation API triggers the policy execution for collecting metrics and events, and also obtains the connection from the connection pool for the invocation of the appropriate API of the SaaS provider. An advantage lies in providing a unified interfacing irrespective of the connectivity approach such as SOAP/REST/web services, etc., whereas an experienced web services programmer otherwise would have to use extensive programming logic for each SaaS application to achieve the same flexibility and effortlessness in order to at the same time provide for rich functionality with respect to policy governance and logging. Another advantage lies in the simplicity with which new connectors (e.g., new SaaS services) can be quickly developed and integrated, in the sense that certain example embodiments help abstract many or most of the common activities involved in SaaS integration. It will be appreciated that the CloudStreams engine shown in FIG. 16 is able to access the policies, credentials, security information, and/or other information, thereby indicating how a cloud can be accessed. In this sense, the CloudStreams Engine instances may be specific to the cloud services offered by a given cloud. As alluded to above, the container including the connector service and the CloudStreams Engine may be an Integration Server in certain example implementations.

Figure 17:
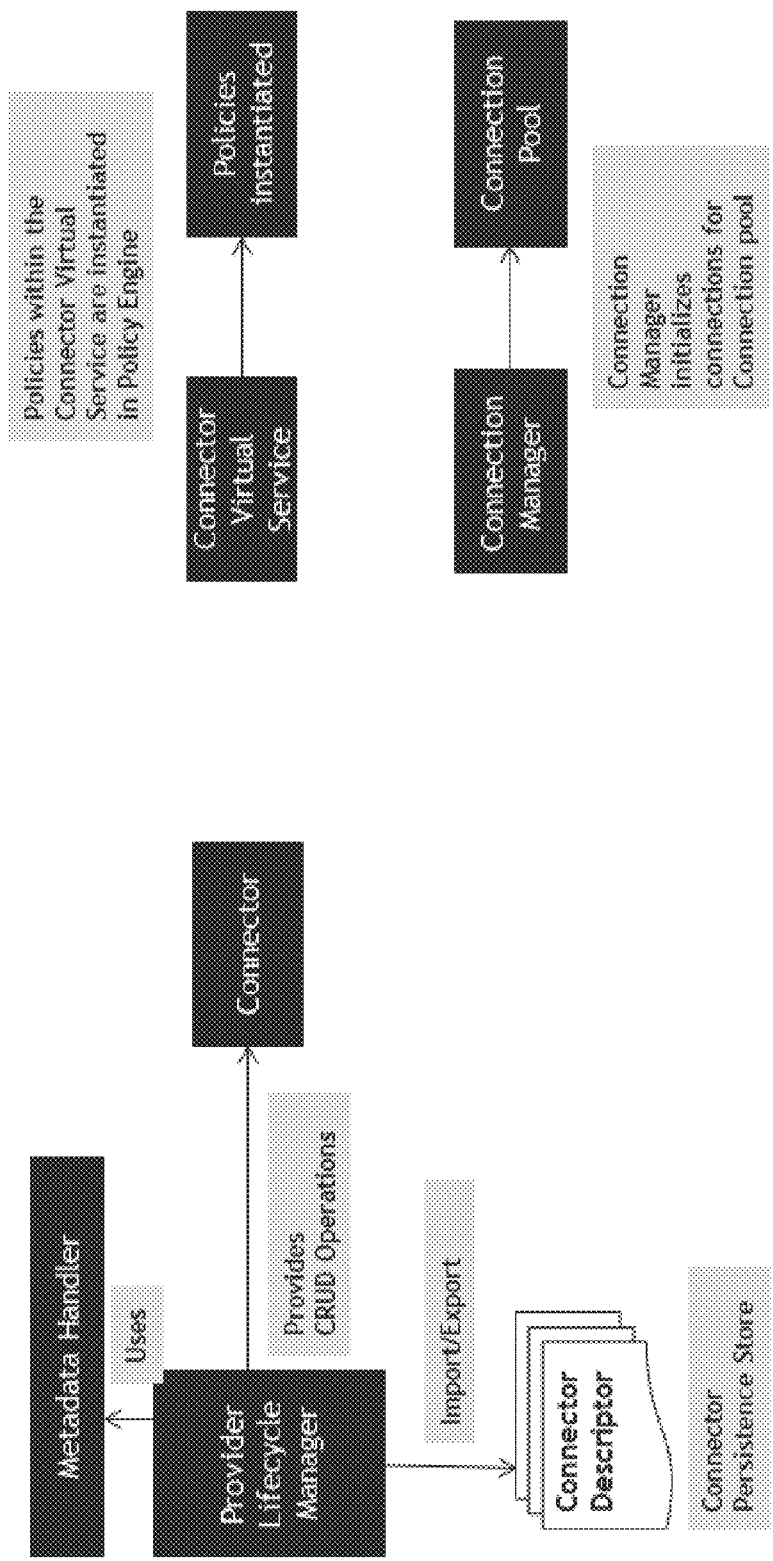
FIG. 17 schematically illustrates the initialization of design time artifacts at runtime in accordance with certain example embodiments.

FIG. 17 schematically illustrates the initialization of design time artifacts at runtime in accordance with certain example embodiments. During initialization of the service container, the CloudStreams engine may initialize and instantiate several artifacts created at design time. For example, the provider lifecycle manager may initialize the instances of the connector by importing the connector descriptors from the persistence store and using the metadata handlers. The connection manager may create connection instances and initialize the connection pool, e.g., with the minimum number of connections. The policy engine may instantiate the policies defined in the connector virtual service and make them available for runtime evaluation and enforcement.

Figure 18:
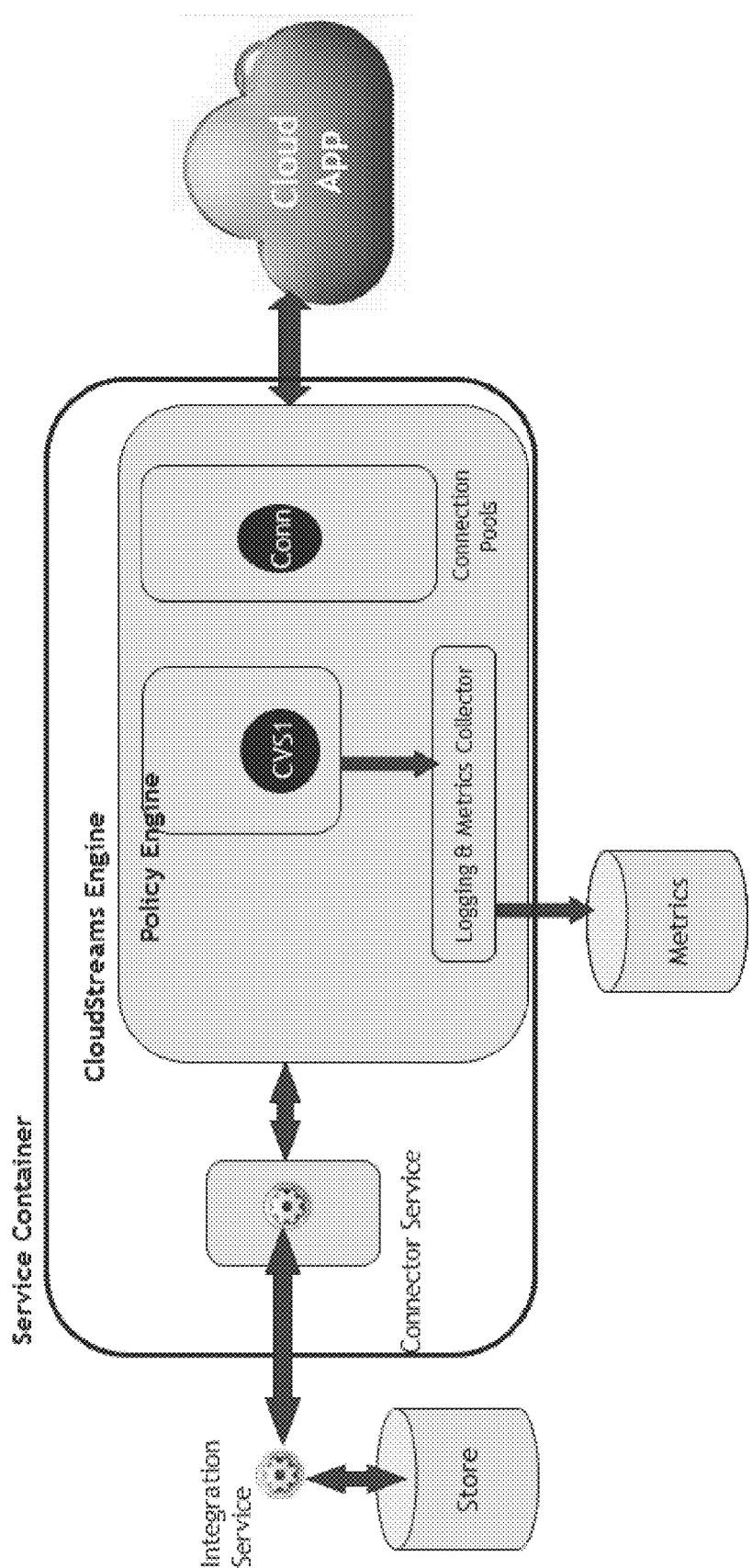
FIG. 18 shows the runtime execution of a connector service in accordance with certain example embodiments.

FIG. 18 shows the runtime execution of a connector service in accordance with certain example embodiments. When an integration service invokes a deployed connector service in a service container (e.g., in response to a client request, with the client potentially being a computer, database, or other resource), several steps occur from the time of invocation to the execution of native SaaS application. In certain example instances, the CloudStreams generic framework runtime APIs execute the policies specified in the connector virtual service and, on successful execution and using a connection instance from the pool, the SaaS application is invoked. The return values are then returned in an appropriate message format, e.g., as defined in the connector service message output signature.

It will be appreciated that the connector virtual service may be acting as a part of a policy engine, identifying policies that are initially checked, etc. In other words, the policy engine may be used to produce events, capture key performance indicator (KPI) data, process extended runtime policies, etc. The architecture of certain example embodiments may employ multiple thread pools and work queues, e.g., to help ensure that engine processing is highly concurrent. Certain example embodiments also may be designed to scale horizontally across multiple servers using a cluster topology. When a service is invoked, KPI data may be extracted and submitted to a separate policy engine component, e.g., where it may be processed asynchronously via a series of thread pools. This approach helps ensure that the calling entity receives its service response as quickly as possible.

Certain example embodiments may be configured to send events to at least a relational database. A dedicated table may be defined for each event type generated at runtime in certain example embodiments.

Certain example embodiments may provide an analytics-driven graphical user interface (GUI), which may in some cases present a unified way to view the metrics and events of the runtime execution of services. For example, the GUI may be used to visualize runtime metric KPIs that can be used to monitor the health of the system.

Example Implementation Using webMethods Products

Figure 19:
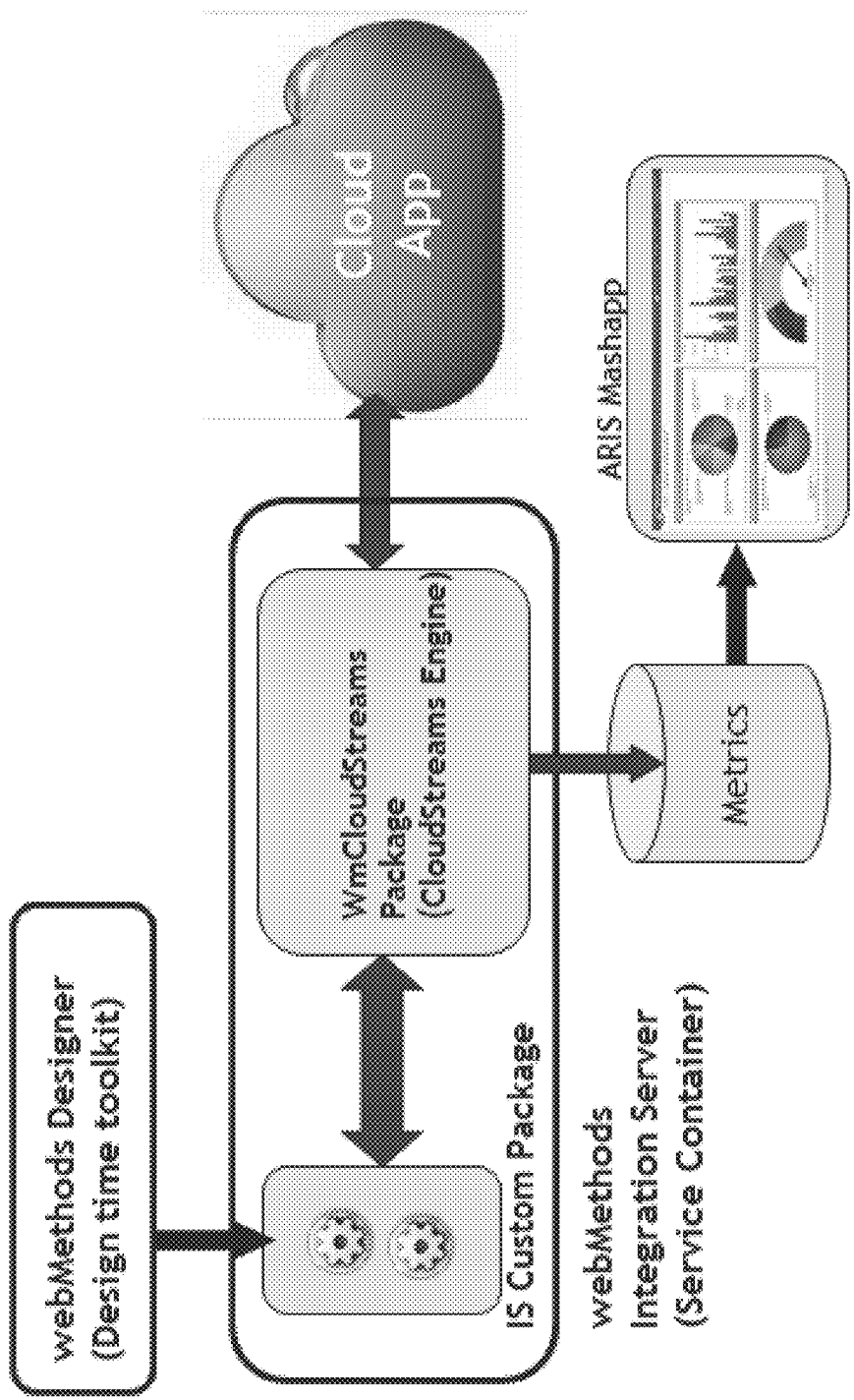
FIG. 19 is a reference implementation showing how components of the webMethods product suite can be used to develop a generic framework for integration of on-premises and SaaS applications in accordance with certain example embodiments.

FIG. 19 is a reference implementation showing how components of the webMethods product suite can be used to develop a generic framework for integration of on-premises and SaaS applications in accordance with certain example embodiments. As shown in FIG. 19, the design time toolkit can be developed using the webMethods Designer; the CloudStreams generic framework engine can be hosted on a service container such as Integration Server; the CloudStreams runtime events may be described in a canonical format and may be sent to one or more predefined destinations including a relational database; and the analytics can be powered by ARIS MashZone MashApps. Of course, other commercially available product suites and/or customized products can be used in different implementations.

Although there are tools and APIs from different cloud and integration vendors already available, they in general enable only a static, rigid way to connect local, on-premises applications with cloud services (and, for example, SaaS applications). It will be appreciated from the foregoing that certain example embodiments provide a dynamic approach that might even be classified as "self-learning" or involving aggregated knowledge. In this regard, certain example embodiments provide instances of key blocks collected by the framework that are reusable and easily modifiable over time. The FIG. 2 layered approach facilitates such features. Perhaps more particularly, in certain example embodiments, the connection factory is responsible for connecting to various cloud providers, and the metadata handlers define the interface API and, thus, the representation of the cloud service. These two are separate modules that may be implemented and aggregated (thereby providing a version of the "self-learning" or aggregated knowledge functionality discussed above) with more and more different on-premises to SaaS application connections. Knowledge may be aggregated in the sense that each new configuration is added, and certain example embodiments at runtime may simply find the suitable module, without "forgetting" the older ones. These two aspects of a cloud service are not necessarily linked. Thus, after a certain period, the on-premises application may end up with five connection factory instances and only three metadata handler instances.

In certain example embodiments, the runtime services connector service and the CloudStreams Engine (e.g., as shown in FIG. 18) help to decouple the client part (e.g., the integration service/store) and the cloud application, e.g., by routing connections through a more central CloudStreams service. This may help to provide a more flexible and adaptable approach.

Although certain example embodiments have been described in connection with specific example service styles (e.g., SOAP, REST, etc.) and/or transport protocols (e.g., HTTP, HTTPS, etc.), it will be appreciated that the example embodiments disclosed herein are not so limited. For example, other service styles over these and/or other transport protocols may be used. One particular implementation includes SOAP over JMS. In this vein, it therefore will be appreciated that the metadata handler and connection factory interfaces in certain example embodiments are sufficiently abstract to encompass a variety of service styles and/or transport protocols (including HTTP And non-HTTP protocols) in different combinations, sub-combinations, and combinations of sub-combinations.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A computer system configured to enable clients to transparently access one or more cloud-based applications managed by one or more respective cloud providers through connector services administered by the computer system, the computer system comprising:
- processing resources including at least one hardware processor and a memory, the processing resources being configured to coordinate at least:
  - a plurality of metadata handlers, each said metadata handler being an implementation of an interface for accessing at least one of the cloud providers in accordance with a data model with which the associated at least one cloud provider communicates;
  - an exporter module configured to generate, for each said metadata handler implementation, connector descriptors that define services offered by the associated at least one cloud provider; and
  - a plurality of connection factory instances implemented separate from the plurality of metadata handlers, each said connection factory instance specifying client transport layer details for interacting with one or more of the cloud providers and/or cloud applications;
- wherein the processing resources are further configured to generate the connector services based on input from the connection factory instances and matching connector descriptors; and
- wherein the clients are able to view and/or invoke services of the one or more cloud providers, independent of configurational details of the one or more providers and/or the one or more applications, and independent of both data model and transport layer details used to communicate with the one or more providers and/or the one or more applications, via the connector services, in enabling the transparent access.

2. The system of claim 1, wherein first and second metadata handler implementations are provided for REST and WSDL based software as a service (SaaS) providers, respectively.

3. The system of claim 2, wherein first and second metadata handler implementations are provided for REST and WSDL data models, and wherein a third metadata handler implementation is provided and defined as an extension to the first and/or second metadata handler implementation(s).

4. The system of claim 1, further comprising connections to a plurality of cloud providers, wherein each said metadata handler implementation includes a group of cloud providers that includes cloud providers that have been grouped together based on their shared attributes.

5. The system of claim 4, wherein a first group implements SOAP services whose operations are defined using a WSDL, and a second group implements REST and includes no additional metadata descriptions.

6. The system of claim 1, wherein schemas for the metadata handler implementations' data models are not explicitly defined in their associated interfaces.

7. The system of claim 1, wherein further connector descriptors are generatable to enable connections between the devices and new cloud applications and/or cloud providers, without having to generate corresponding code at the metadata handler's interface level.

8. The system of claim 1, wherein the connection factory instances expose their associated transport layers' configuration features in terms of configurable groups.

9. The system of claim 1, wherein the client transport layer details in the connection factory instances specify at least login credentials and transport protocols for the respective cloud providers and/or cloud-based applications.

10. A client device configured to transparently access one or more cloud-based applications managed by one or more respective cloud providers, the client device comprising:
- at least one hardware processor; and
- an interface to connector services administered by a computer system, the computer system being configured to coordinate at least:
  - a plurality of metadata handlers, each said metadata handler being an implementation of an interface for accessing at least one of the cloud providers in accordance with a data model with which the associated at least one cloud provider communicates;
  - an exporter module configured to generate, for each said metadata handler implementation, connector descriptors that define services offered by the associated at least one cloud provider; and
  - a plurality of connection factory instances implemented separate, and being different, from the plurality of metadata handlers, each said connection factory instance specifying client transport layer details for interacting with one or more of the cloud providers and/or cloud applications;
- wherein the connector services are generated by the computer system based on input from the connection factory instances and matching connector descriptors; and
- wherein the client device is able to view and/or invoke services of the one or more cloud providers, independent of configurational details of the one or more providers and/or the one or more applications, and independent of both data model and transport layer details used to communicate with the one or more providers and/or the one or more applications, via the connector services, in enabling the transparent access.

11. A first cloud provider in a system including a plurality of cloud providers that manage one or more cloud-based applications, wherein the cloud providers are transparently accessible by one or more client devices through connector services administered by a server, the first cloud provider comprising:
- processing resources, including at least one processor, a memory, and/or non-transitory storage, that are accessible by the one or more client devices via the server, the server being configured to coordinate at least:
  - a plurality of metadata handlers, each said metadata handler being an implementation of an interface for accessing at least one of the cloud providers in accordance with a data model with which the associated at least one cloud provider communicates;
  - an exporter module configured to generate, for each said metadata handler implementation, connector descriptors that define services offered by the associated at least one cloud provider; and
  - a plurality of connection factory instances implemented separate from the plurality of metadata handlers, each said connection factory instance specifying client transport layer details for interacting with one or more of the cloud providers and/or cloud applications;
- wherein the connector services are generated based on input from the connection factory instances and matching connector descriptors; and
- wherein each of the one or more client devices is able to view and/or invoke services of the cloud providers, independent of configurational details of the providers and/or the one or more applications, and independent of both data model and transport layer details used to communicate with the providers and/or the one or more applications, via the connector services, in enabling the transparent access.

12. A method of configuring a computer system that enables clients to transparently access one or more cloud-based applications managed by one or more respective cloud providers through connector services administered by the computer system, the method comprising:

defining a plurality of metadata handlers, each said metadata handler being an implementation of an interface for accessing at least one of the cloud providers in accordance with a data model with which the associated at least one cloud provider communicates;
    generating, in connection with an exporter module, for each said metadata handler implementation, connector descriptors that define services offered by the associated at least one cloud provider; and
    specifying client transport layer details for interacting with one or more of the cloud providers and/or cloud applications in connection with a plurality of connection factory instances that are implemented separate from the plurality of metadata handlers;
    generating, in connection with at least one processor, the connector services based on input from the connection factory instances and matching connector descriptors; and
    enabling the clients to view and/or invoke services of the one or more cloud providers, independent of configurational details of the one or more providers and/or the one or more applications, and independent of both data model and transport layer details used to communicate with the one or more providers and/or the one or more applications, via the connector services.

13. The method of claim 12, wherein first and second metadata handler implementations are provided for REST and WSDL based software as a service (SaaS) providers, respectively.

14. The method of claim 13, wherein first and second metadata handler implementations are provided for REST and WSDL data models, and wherein a third metadata handler implementation is provided and defined as an extension to the first and/or second metadata handler implementation(s).

15. The method of claim 12, further comprising setting up connections to a plurality of cloud providers, wherein each said metadata handler implementation includes a group of cloud providers that includes cloud providers that have been grouped together based on their shared attributes.

16. The method of claim 15, wherein a first group implements SOAP services whose operations are defined using a WSDL, and a second group implements REST and includes no additional metadata descriptions.

17. The method of claim 12, wherein schemas for the metadata handler implementations' data models are not explicitly defined in their associated interfaces.

18. The method of claim 12, further comprising generating further connector descriptors to enable connections between the devices and new cloud applications and/or cloud providers, without having to generate corresponding code at the metadata handler's interface level.

19. The method of claim 12, further comprising causing the connection factory instances to expose their associated transport layers' configuration features in terms of configurable groups.

20. The method of claim 12, wherein the client transport layer details in the connection factory instances specify at least login credentials and transport protocols for the respective cloud providers and/or cloud-based applications.

21. The method of claim 12, further comprising receiving input through one or more wizard-based tools, the received input corresponding to data such as (a) which services and/or aspects thereof should be made available to the clients, (b) data model and/or transport layer details used to communicate with the one or more providers and/or the one or more applications, (c) how cloud providers can be grouped together in the metadata handler implementations, and/or (d) how the connection factory instances' associated transport layers can be grouped together for configurational purposes.

22. A method of executing an application in connection with client devices connected to a computer system that enables the client devices to transparently access one or more cloud-based applications managed by one or more respective cloud providers through connector services administered by the computer system, the method comprising:

configuring the computer system in accordance with the method of claim 12; and
    enabling the client devices to access the one or more cloud-based applications in connection with the connector services administered by the computer system in the executing of the application.

23. The method of claim 22, further comprising initializing instances of the connector services by importing the connector descriptors from a persistence store and using the metadata handlers.

24. The method of claim 12, further comprising creating connection instances and initializing a connection pool that indirectly connects the client devices with the one or more cloud providers.

25. The method of claim 22, further comprising, in connection with a policy engine cooperating with at least one processor, instantiating policies defined in a connector virtual service and making the instantiated policies available for runtime evaluation and enforcement.

26. The method of claim 25, further comprising executing the policies specified in the connector virtual service and, on successful execution of the policies, invoking a software as a service application operating on one said cloud provider in cooperation with a connection instance.

27. The method of claim 22, further comprising receiving values returned from a cloud provider in a message format defined in the associated connector service's message output signature.

28. The method of claim 27, further comprising relaying the received values onto the clients, as appropriate.

29. The method of claim 22, further comprising producing events, capturing key performance indicator (KPI) data, and/or processing extended runtime policies in connection with a policy engine operating in the computer system.

30. A non-transitory computer readable storage medium tangibly storing a program that, when executed by a processor of a computer system, performs the method of claim 12.

* * * * *